United States Patent
Thomas et al.

(10) Patent No.: US 6,616,537 B2
(45) Date of Patent: Sep. 9, 2003

(54) CONSTANT VELOCITY JOINT

(75) Inventors: Steven Mark Thomas, Saginaw, MI (US); William Paul Skvarla, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/960,091

(22) Filed: Sep. 20, 2001

(65) Prior Publication Data

US 2003/0054892 A1 Mar. 20, 2003

(51) Int. Cl.[7] .............................................. F16D 3/224

(52) U.S. Cl. ........................................ 464/145; 464/906

(58) Field of Search ................................ 464/906, 145, 464/143, 141, 139

(56) References Cited

U.S. PATENT DOCUMENTS

| | | | | | |
|---|---|---|---|---|---|
| 2,140,295 | A | * | 12/1938 | Mallard ........................ | 464/143 |
| 2,653,456 | A | * | 9/1953 | Heym .......................... | 464/141 |
| 4,054,039 | A | * | 10/1977 | Takahashi et al. ........... | 464/146 |
| 4,358,283 | A | * | 11/1982 | Kumpar ....................... | 464/143 |
| 4,459,122 | A | * | 7/1984 | Rehfeld ....................... | 403/114 |
| 5,201,107 | A | * | 4/1993 | Mazziotti ..................... | 29/434 |
| 5,230,659 | A | * | 7/1993 | Bird et al. ................... | 464/143 |

* cited by examiner

Primary Examiner—Lynne H. Browne
Assistant Examiner—Kenn Thompson
(74) Attorney, Agent, or Firm—Edmund P. Anderson

(57) ABSTRACT

A compact constant velocity joint includes outer and inner joint members having surfaces to provide articulation of the joint. The surfaces are formed with aligned grooves to receive torque-transmitting balls. A ball retainer is provided axially adjacent the balls, adjacent an open end of the outer joint member to retain the balls in the grooves during operation. The ball retainer articulates on the same center point as that of the outer and inner joint members.

9 Claims, 3 Drawing Sheets

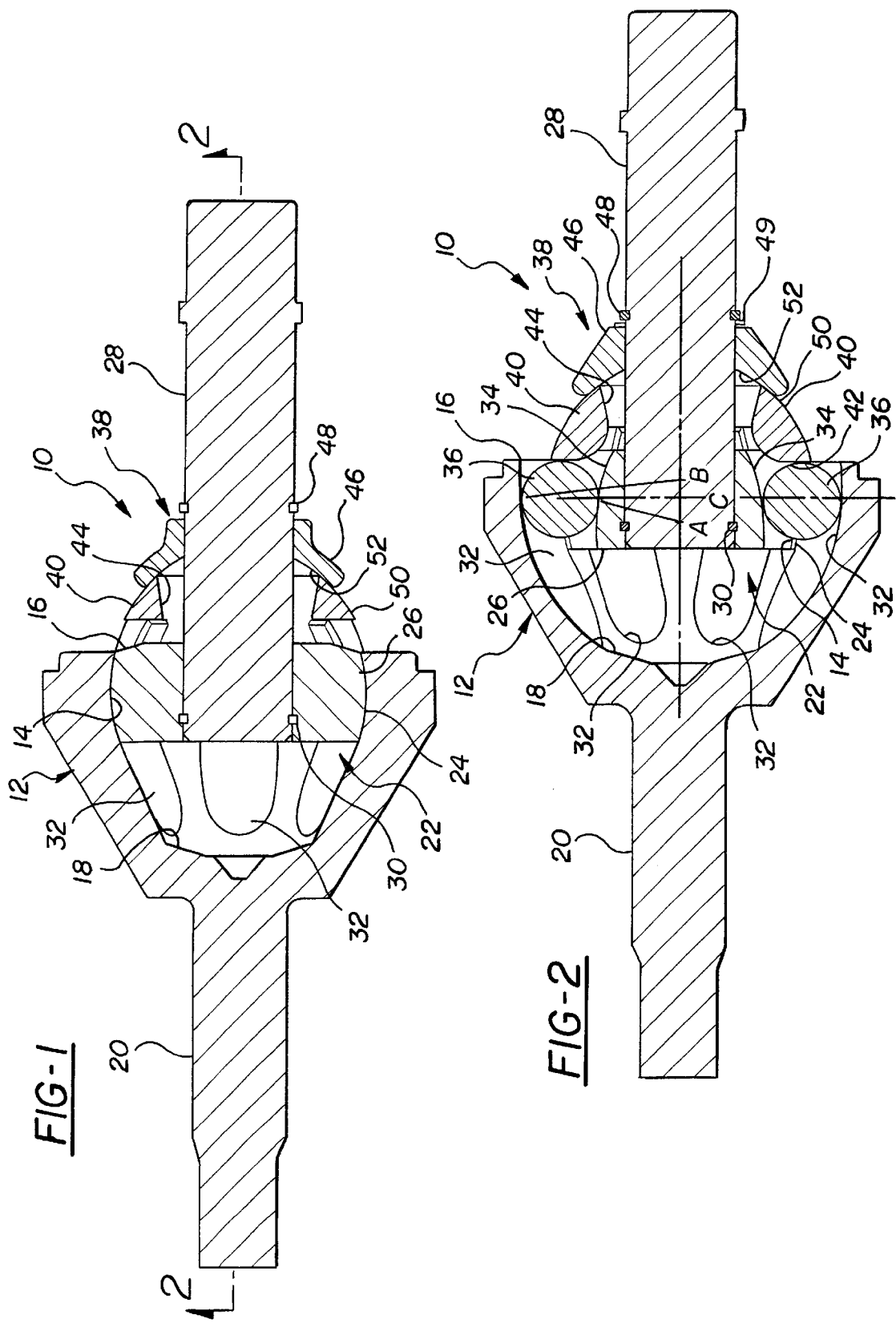

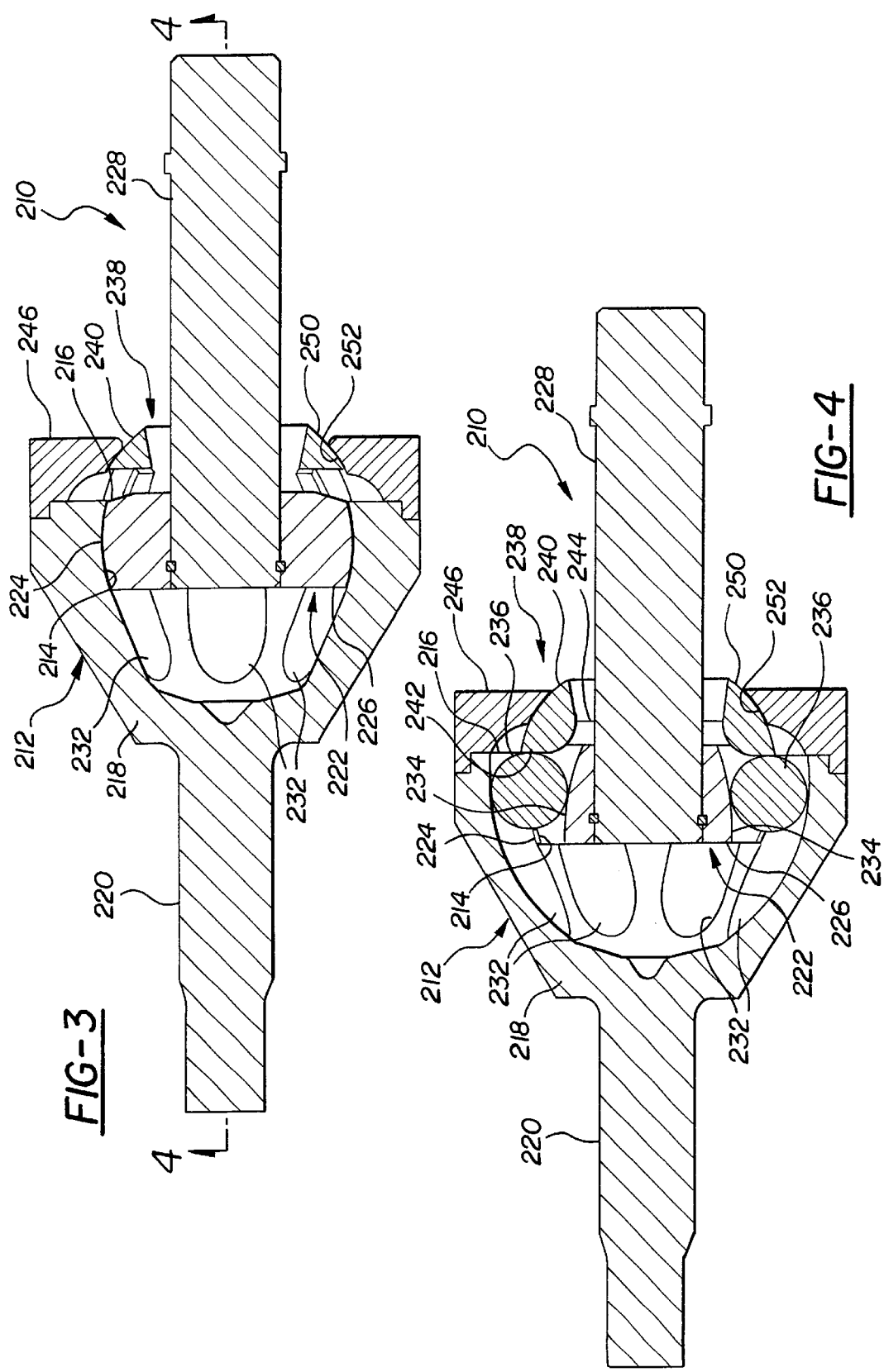

CONSTANT VELOCITY JOINT

BACKGROUND OF THE INVENTION

1. Technical Field

This invention relates to constant velocity universal joints.

2. Related Art

Constant velocity joints are used to transmit torque through an angle while maintaining constant velocity ratio between a driving and driven shaft member of the joint at all angles. A typical constant velocity joint includes an outer member formed with a part-spherical inner surface and a series of ball grooves, an inner member formed with a part-spherical outer surface and a series of complementing ball grooves aligned with the grooves of the outer joint member, a torque-transmitting ball disposed in each groove pair, and a ball cage disposed between the inner and outer joint members and having part-spherical surfaces and contact with those of the inner and outer joint members for articulation of the joint.

The size of the joint is dependent in part on the angle to be achieved and the stack-up dimensions of the component parts, namely the inner joint part, the outer joint part and the intervening ball cage. Reducing the thickness of any one or more of these components may impair the strength or integrity of the joint, and thus there is a limit to how small a conventional constant velocity joint can be made without detracting from its strength or reducing its degree of articulation.

U.S. Pat. Nos. 5,201,107 and 5,230,659 disclose constant velocity joints in which the conventional cage is eliminated and the ball grooves of the outer joint part formed at a convergent angle toward the open end of the joint such that the walls of the grooves retain the balls from escape through the open end of the joint. An internal retainer plate or cage is disposed within the outer member axially behind the terminal end of the inner member. The retainer reacts against the outer member and the balls to keep the balls within the grooves during angulation of the joint. Both joints are of rather complex construction, requiring special machining and component parts as well as special installation techniques to assemble the parts.

It is an object of the present invention to simplify the construction and manufacture of a compact constant velocity joint.

SUMMARY OF THE INVENTION AND ADVANTAGES

A constant velocity joint constructed according to the invention comprises an outer joint member having at least one open end and an inner joint member disposed at least partially within the outer joint member. The outer and inner joint members have inner and outer contact surfaces which engage one another to permit relative articulation between the outer and inner joint members. The outer joint member has a plurality of circumferentially spaced grooves formed in the inner contact surface which extend axially to the open end of the outer joint member. The inner joint member has a plurality of complementary circumferentially spaced grooves formed in the outer contact surface and aligned with the grooves of the outer joint member to define facing pairs of grooves. The grooves of the joint members are of arcuate form and have centers of curvature spaced so that the grooves of each pair diverge from one another axially toward the open end of a joint member. A plurality of torque-transmitting balls are disposed one in each groove pair. A ball retainer is supported by one of the joint members axially adjacent the balls and adjacent the open end of the outer joint member in axially spaced relation to the contact surfaces of the joint members. The ball retainer confronts the balls to axially retain the balls within the groove pairs against escape through the open end of the outer joint member.

The invention further contemplates a method of fabricating a constant velocity joint in which the outer and inner joint members are formed with the contact surfaces and complementing balls grooves above. Once formed, the inner joint member is inserted at least partially into the outer joint member through the open end thereof to bring the contact surfaces of the joint members into contact with one another to provide relative articulation of the outer and inner joint members about a center and to provide associated pairs of grooves which extend to the open end of the outer joint member. Once the inner joint member is installed within the outer joint member, a torque-transmitting ball is installed in each groove pair. Following installation of the balls, a ball retainer is installed adjacent the open end of the outer joint member to retain the balls within the grooves.

The present invention has the advantage of providing a compact constant velocity joint through elimination of the standard ball cage normally present to contain the balls but adding radially thickness to the joint assembly. By eliminating the ball cage, the overall radial size of the joint is decreased. Further, the subject cage-less constant velocity joint improves upon the prior art cage-less type joints by simplifying the geometry of the contact surfaces and ball grooves and moving the ball retainer outboard of the outer member. The construction and method thus has the advantage of providing a simple, inexpensive process for manufacturing and assembling the component parts.

THE DRAWINGS

Presently preferred embodiments of the invention are disclosed in the following description and in the accompanying drawings, wherein:

FIG. 1 is a cross-sectional view of a joint constructed according to a first embodiment of the invention;

FIG. 2 is a cross-sectional view taken along lines 2—2 of FIG. 1;

FIG. 3 is cross-sectional view like that of FIG. 2, but of an alternative embodiment of the invention;

FIG. 4 is a cross-sectional view taken along lines 4—4 of FIG. 3;

DETAILED DESCRIPTION OF PREFERRED EMBODIMENT

Figure 5:
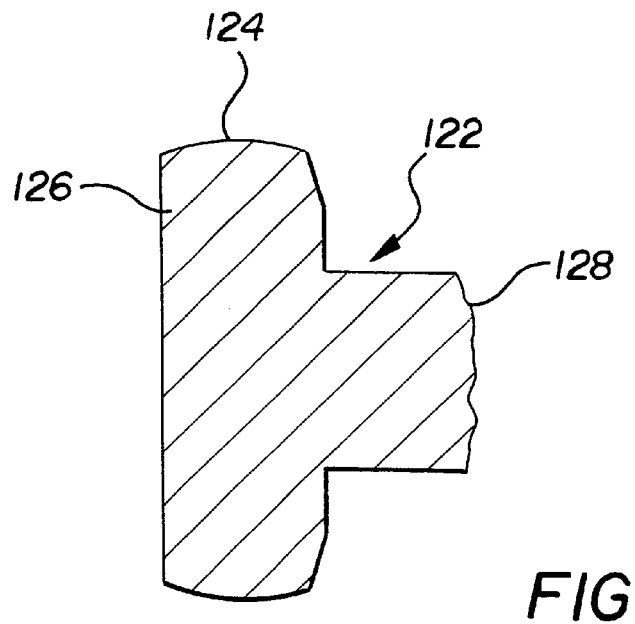
FIG. 5 is a cross-sectional view of an optional inner joint member.

A constant velocity joint assembly constructed according to a first embodiment of the invention is shown generally at 10 in FIGS. 1 and 2 and comprises an outer joint member or race 12 having an inner contact surface 14 which is preferably part-spherical. The outer joint member 12 has at least one open end 16 at one axial end of the joint. In the embodiment shown, the axially opposite end of the outer joint member 12 has a closed end 18 from which an axle 20 extends.

The joint assembly 10 includes an inner joint member generally indicated at 22 which is disposed at least partly within the outer joint member 12 and is formed with a part-spherical outer surface 24 that engages the complementing inner surface 14 of the outer joint member 12 to enable the outer 12 and inner 22 joint members to articulate about a common center C.

The inner joint member 22 includes an inner race portion 26 and an axle portion 28. The inner race portion 26 is disposed in contact with the outer joint member 12 and the axle portion 28 extends through and outwardly of the open end 16 of the outer joint member 12 in the opposite direction of the axle 20. In this first embodiment, the inner race 26 and axle portions 28 of the inner joint member 22 are shown constructed as separate components which are subsequently joined such as by a splined connection and retainer ring 30. According to an alternative construction of the inner joint member as illustrated in FIG. 5 wherein the same reference numerals have been used to indicate like features, but are increased by 100, the inner joint member 122 is constructed such that the inner race 126 and axle 128 are formed as one piece from the same material.

The outer joint member 12 is formed with a plurality of circumferentially spaced, axially extending grooves 32 which extend to the open end 16 and are recessed in the inner part-spherical 14. The part-spherical surface 24 of the inner race 26 is likewise formed with a plurality of circumferentially spaced, axially extending grooves 34 which align with the grooves 32 of the outer joint member 12 to define a plurality of pairs of opposed grooves, in each of which is disposed a torque-transmitting ball. Any number of groove pairs and balls can be provided with a minimum of three and as many as eight or more if desired, with both odd and even numbers of sets contemplated. The illustrated joint assembly 10 is of a six-ball configuration.

As illustrated best in FIG. 2, the center of curvature of the inner part-spherical surface 14 of the outer joint member 12 is axially offset from the center point C toward the open end 16 of the joint at location B, whereas the center of curvature of the outer part-spherical surface of the inner joint member 22 is offset by an equal distance from the center point C in the opposite direction from center C at the location A. This offset relationship provides each groove pair with outwardly divergent groove surfaces which widen when the joint is at 0 angle in the direction of the open end. The size of the opening provided by the groove pairs at the outer end is greater than the diameter of the balls 36, and tapers to an equal size to that of the ball diameter in a plane containing the center point C, such that the center plane of the balls corresponds with the center plane of the joint. Such a divergent relationship of the groove surfaces has a tendency, when the joint is under load, to urge the balls 36 axially outwardly toward the open end 16 of the joint 10. According to the invention, the balls 36 are held in the groove pairs by a ball retainer 38 which is disposed axially adjacent the balls 36, adjacent the open end 16 of the outer joint member 12 and in confronting contact with the balls 36 to hold them in place in the grooves at all angles. The ball retainer 38 is disposed axially adjacent the part-spherical surfaces 14, 24 of the outer and inner joint members 12, 22, respectively, as shown best in FIG. 2. The ball retainer 38 includes a partial cage 40 with an axially inner surface 42 which confronts and guides the balls 36 and a central opening 44 through which the axle 28 extends. The central opening 44 is enlarged relative to the size of the axle 28 such that there is sufficient clearance provided to accommodate the articulation of the joint.

The partial cage 40 is restrained axially by a seat 46. The seat 46 is formed as a separate component of the partial cage 40 and, in this embodiment, is fixed to the inner joint member 22, and preferably to the axle 28. The seat 46 may be formed as one piece with the axle 28, or formed as a separate component as shown, and restrained axially such as by a retaining ring 48 or by other means such as a shoulder or the like. The partial cage 40 has a surface 50 which has a center of curvature corresponding to the center C of the joint 10. The seat 46 has a complementing surface 52 which engages the surface 50 of the partial cage 40 to provide a socket to support the partial cage 40 for movement relative to the outer and inner joint members 12, 22 and relative to the seat 46 about the center point C. The surfaces 50, 52 are preferably part-conical in shape having their centers of curvature at C. During joint articulation, the partial cage 40 floats in the seat 46 as required to maintain contact with the balls 36 to keep them retained in their grooves. A spring 49, such as a wave spring, is disposed between the retaining ring 48 and the seat 46 and acts under constant axial compression load to urge the seat 46 axially toward the partial cage 40 at all joint angles to keep the surfaces 50, 52 in contact and the partial cage 40 in contact with the balls 36.

It will be appreciated from FIGS. 1 and 2 that the outer diameter of the joint 10 is determined by the diameter of the inner and outer joint members and is independent from the diameter of the ball retainer 38.

To assemble the joint 10, the outer and inner joint members 12, 22 are separately manufactured as previously described. The inner joint member 22 is installed in the outer joint member 12 in the positions shown in FIGS. 1 and 2, with the surfaces in contact with one another. In the case where the axle 28 is formed separately from the inner race 26 and the seat 46 is fixed to the axle 28, from the inner race 26 the inner race 26 is first installed in the outer joint member 12 after which, one of the balls 36 is dropped into each groove pair through the larger end at the open end 16 of the joint. Once the balls 36 are installed, the partial cage 40 is placed on top of the balls 36 and retained by extending the axle 28 into the inner race 26 where it is secured by the retaining ring 30 while positioning the seat 46 in contact with the partial cage 40 as shown. In the case where the inner race is formed as one piece with the axle (FIG. 5) the seat 146 is formed separately and installed on the axle following installation of the partial cage 140.

FIGS. 3 and 4 show an alternative embodiment of the invention, wherein the components and operation are identical except that the seat 46 is removed from the axle 28 and mounted on the outer joint member 12 as will be explained. For purposes of this second embodiment, the same reference numerals are used to designate like components, but are offset by 200.

The seat 246 of this alternative embodiment is in the form of an outer ring which is secured, either removably or permanently following installation of the inner joint member 22, to the outer joint member 12. The seat 246 has an inner surface 52 which engages the surface 50 of the partial cage 40 to provide articulated support to the partial cage 240 about the common center of the joint as before. The construction and method of assembly is otherwise identical, as is the operation of the joint. The seat 246 can be used in conjunction with the two piece or one piece inner joint member described above.

Figure 6:
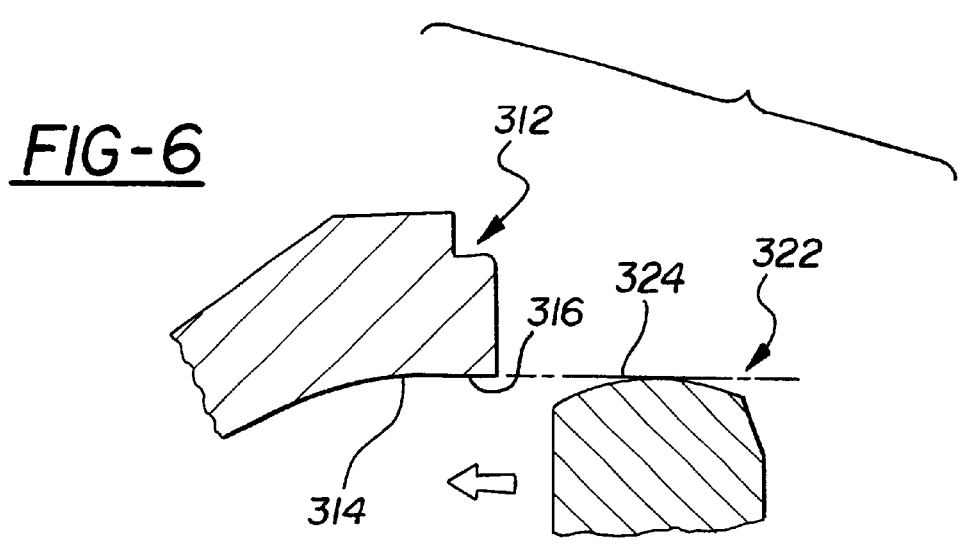
FIG. 6 is a fragmentary cross-sectional view of an alternative outer joint member construction.

FIG. 6 shows an alternative embodiment of the outer joint member 312, wherein the same reference numerals are used to designate like features, but are offset by 300. The inner surface 314 is formed without an undercut at the open end 16, such that the diameter of the inner surface at the open end 16 is the same or slightly greater than the diameter of the outer surface 24 of the inner joint member 22. This construction enables the inner race portion 26 of the inner joint member 22 to be installed into the open end 16 of the outer joint member 12 with the ball grooves 32, 34 aligned. Otherwise, the inner joint member 22 must be initially rotated such that the grooves are out of alignment to allow the lands between the grooves 34 of the inner joint member 22 to pass along the grooves 32 of the outer joint member 22 until fully inserted, at which point the inner joint member can be rotated into position where the grooves 32, 34 are aligned. The undercut-free embodiment of FIG. 6 further simplifies the assembly process.

The disclosed embodiments are representative of presently preferred forms of the invention, but are intended to be illustrative rather than definitive thereof. The invention is defined in the claims.

What is claimed is:

1. A constant velocity joint assembly comprising:
   an outer joint member having at least one open end;
   an inner joint member disposed at least partially within said outer joint member;
   said outer and inner joint members having inner and outer contact surfaces, respectfully, which engage to permit relative articulation between said outer and inner joint members;
   said outer joint member having a plurality of circumferentially spaced grooves formed in said inner contact surface extending axially to said at least one open end of said outer joint member;
   said inner joint member having a plurality of complementary circumferentially spaced grooves formed in said outer contact surface and aligned with said grooves of said outer joint member to define facing pairs of said grooves;
   said grooves of said outer and said inner joint members being of arcuate form and having centers of curvature spaced so that said grooves of each said pair diverge from one another axially toward said at least one open end of said outer joint member;
   a plurality of torque-transmitting balls disposed one in each of said groove pairs;
   a ball retainer supported by on one of said inner and outer joint members axially adjacent said balls adjacent said open end of said outer joint member and confronting said balls to axially retain said balls within said groove pairs against escape through said at least one open end of said outer joint member;
   said inner joint member including an inner race and an axle extending axially from said inner race outwardly through said open end of said outer joint member;
   said ball retainer being supported by said axle;
   said ball retainer including a partial cage member engaging said balls and a separate cage seat supported by said axle and engaging said partial cage member;
   said partial cage member being movable relative to said cage seat; and
   wherein said cage seat is urged under constant spring force axially toward and into engagement with said partial cage member.

2. The assembly of claim 1, wherein said inner and outer joint members and said partial cage member are supported for articulation about a common center.

3. The assembly of claim 1 wherein said inner race and said axle are separately formed.

4. The assembly of claim 1 wherein said inner race and said axle are formed as a single piece.

5. A constant velocity joint assembly comprising:
   an outer joint member having at least one open end;
   an inner joint member disposed at least partially within said outer joint member;
   said outer and inner joint members having inner and outer contact surfaces, respectfully, which engage to permit relative articulation between said outer and inner joint members;
   said outer joint member having a plurality of circumferentially spaced grooves formed in said inner contact surface extending axially to said at least one open end of said outer joint member;
   said inner joint member having a plurality of complementary circumferentially spaced grooves formed in said outer contact surface and aligned with said grooves of said outer joint member to define facing pairs of said grooves;
   said grooves of said outer and said inner joint members being of arcuate form and having centers of curvature spaced so that said grooves of each said pair diverge from one another axially toward said at least one open end of said outer joint member;
   a plurality of torque-transmitting balls disposed one in each of said groove pairs;
   a ball retainer supported by on one of said inner and outer joint members axially adjacent said balls adjacent said open end of said outer joint member and confronting said balls to axially retain said balls within said groove pairs against escape through said at least one open end of said outer joint member;
   said inner joint member including an inner race and an axle extending axially from said inner race outwardly through said open end of said outer joint member;
   said ball retainer being supported by said outer joint member;
   said ball retainer including a partial cage member engaging said balls and a separate cage seat supported by said outer joint member and engaging said partial cage, said partial cage member being movable relative to said cage seat; and
   wherein said partial cage member and said cage seat have contact surfaces which engage to permit said partial cage member to articulate relative to said cage seat.

6. The assembly of claim 5 wherein said inner and outer joint members and said partial cage member are supported for articulation about a common center.

7. A constant velocity joint assembly comprising:
   an outer joint member having at least one open end;
   an inner joint member disposed at least partially within said outer joint member;
   said outer and inner joint members having inner and outer contact surfaces, respectfully, which engage to permit relative articulation between said outer and inner joint members;
   said outer joint member having a plurality of circumferentially spaced grooves formed in said inner contact surface extending axially to said at least one open end of said outer joint member;
   said inner joint member having a plurality of complementary circumferentially spaced grooves formed in said outer contact surface and aligned with said grooves of said outer joint member to define facing pairs of said grooves;

said grooves of said outer and said inner joint members being of arcuate form and having centers of curvature spaced so that said grooves of each said pair diverge from one another axially toward said at least one open end of said outer joint member;

a plurality of torque-transmitting balls disposed one in each of said groove pairs;

a ball retainer supported by on one of said inner and outer joint members axially adjacent said balls adjacent said open end of said outer joint member and confronting said balls to axially retain said balls within said groove pairs against escape through said at least one open end of said outer joint member;

said inner joint member including an inner race and an axle extending axially from said inner race outwardly through said open end of said outer joint member; and wherein said ball retainer includes a partial cage member engaging said balls and a separate cage seat engaging and supporting said partial cage for articulation about a center C common to a center of articulation of said outer and inner joint members.

8. The assembly of claim 7 wherein said partial cage has a central opening through which said axle extends.

9. The assembly of claim 8 wherein said central opening is oversized in relation to the axle to accommodate said articulation of said outer and inner joint members.

* * * * *